(12) United States Patent
Gavit et al.

(10) Patent No.: US 6,804,080 B1
(45) Date of Patent: Oct. 12, 2004

(54) MEDIA CAROUSEL CHANGER FOR DATA SYSTEMS

(75) Inventors: Stephan E. Gavit, Lakewood, CO (US); Scott A. Dye, Morrison, CO (US); Robert E. Leonard, Denver, CO (US)

(73) Assignee: Segway Systems, LLC, Littleton, CO (US)

( * ) Notice: Subject to any disclaimer, the term of this patent is extended or adjusted under 35 U.S.C. 154(b) by 957 days.

(21) Appl. No.: 08/922,581

(22) Filed: Sep. 3, 1997

(51) Int. Cl.⁷ .............................................. G11B 15/68
(52) U.S. Cl. ....................................................... 360/92
(58) Field of Search .......................... 369/37, 35, 30.7; 360/92

(56) References Cited

U.S. PATENT DOCUMENTS

| | | | | |
|---|---|---|---|---|
| 3,511,508 A | * | 5/1970 | Ban ............................. | 360/92 |
| 3,617,066 A | * | 11/1971 | Foelkel et al. ................ | 360/92 |
| 3,807,741 A | * | 4/1974 | Uemura ....................... | 360/92 |
| 4,361,858 A | * | 11/1982 | Chambers .................... | 360/92 |
| 4,901,172 A | * | 2/1990 | Nakazawa et al. ........ | 360/98.05 |
| 5,148,332 A | * | 9/1992 | Tomita et al. ................ | 360/92 |
| 5,515,213 A | * | 5/1996 | Elliott ......................... | 360/92 |
| 5,539,594 A | * | 7/1996 | Ito ............................... | 360/92 |

* cited by examiner

*Primary Examiner*—David Davis
(74) *Attorney, Agent, or Firm*—Timothy J. Martin; Michael R. Henson; Rebecca A. Gegick

(57) ABSTRACT

A media carousel changer is adapted to receive a plurality of cassettes to mount them in and demount them from a docking station on a recorder/reader such that data can be accessed. The changer includes a rotatable turntable on a support frame. Cassette holders for the cassettes are located at the periphery of the turntable and are pivotable between an extended position and a retracted position. A plunger arm is linearly movable between an advanced position to pivot a registered one of the cassette holders to the extended position to move the cassette into a docked state on the docking station and a withdrawn position to permit the cassette holder to pivot into the retracted position thereby to demount the cassette. A rotary drive rotates the turntable to select the desired cassette.

27 Claims, 9 Drawing Sheets

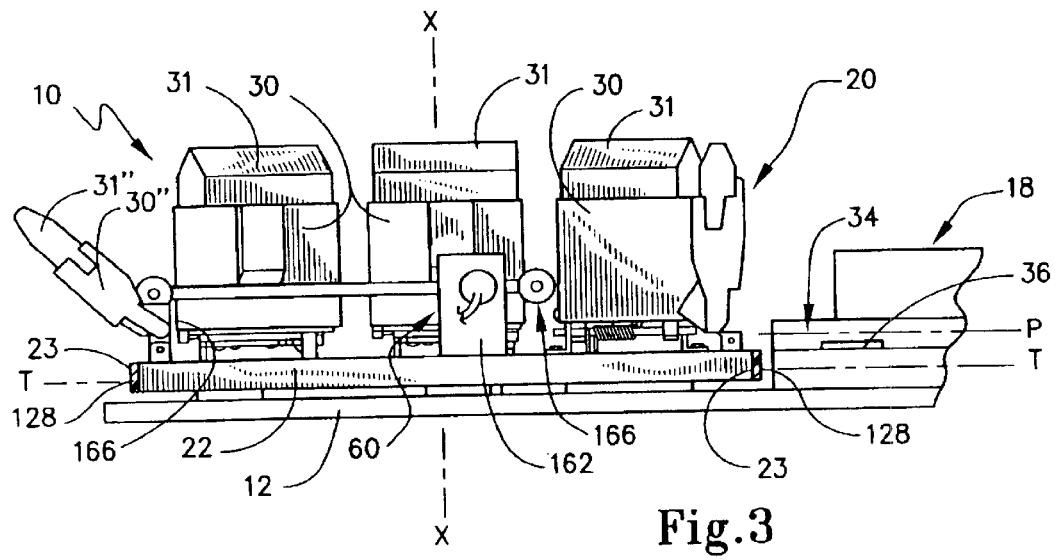
Fig.3
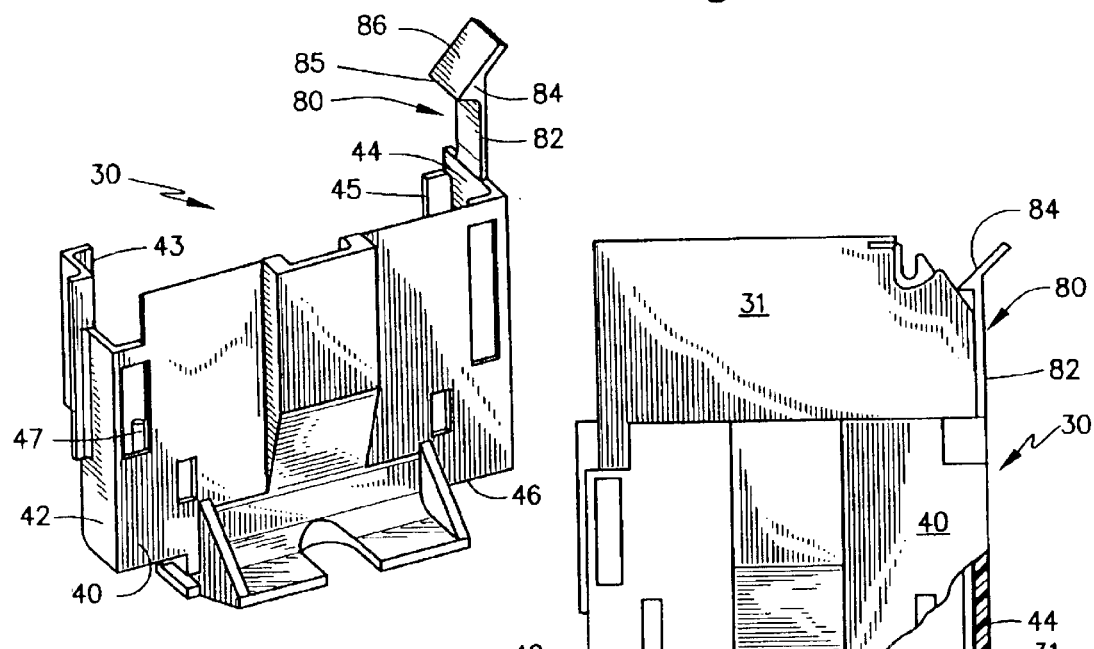
Fig.4
Fig.5

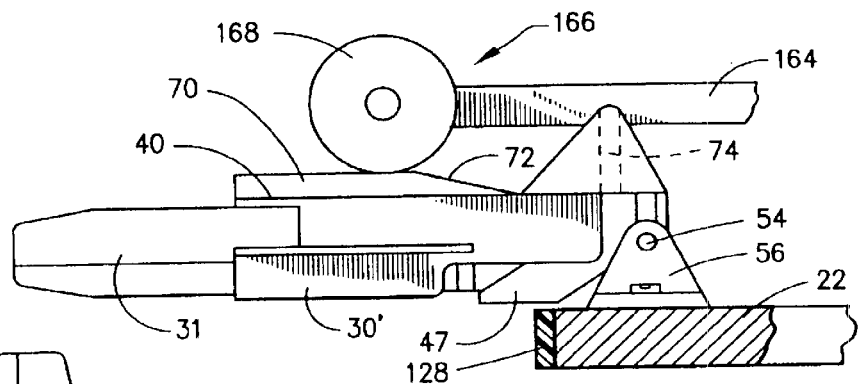
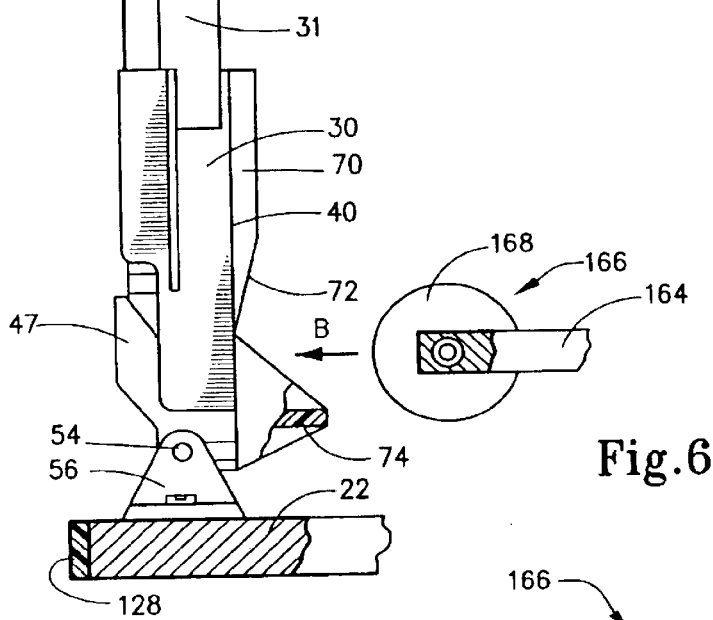
Fig.7
Fig.6
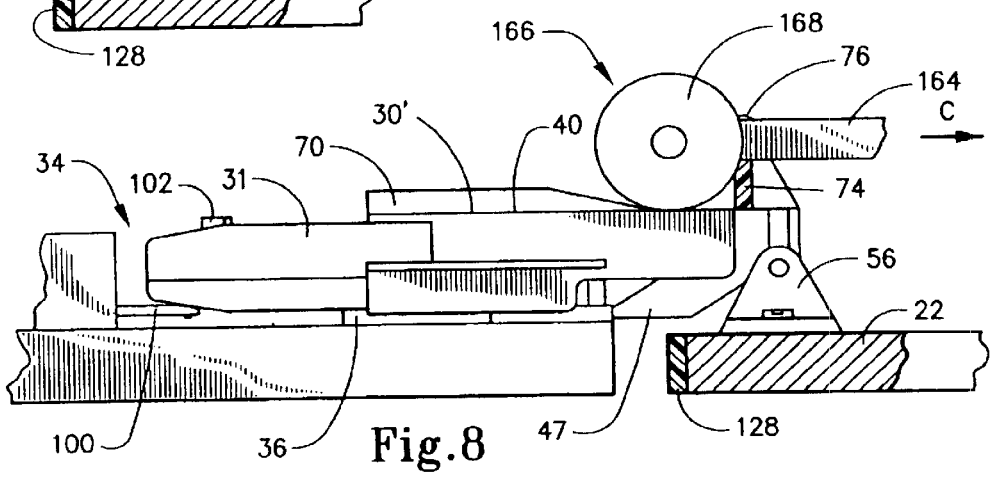
Fig.8

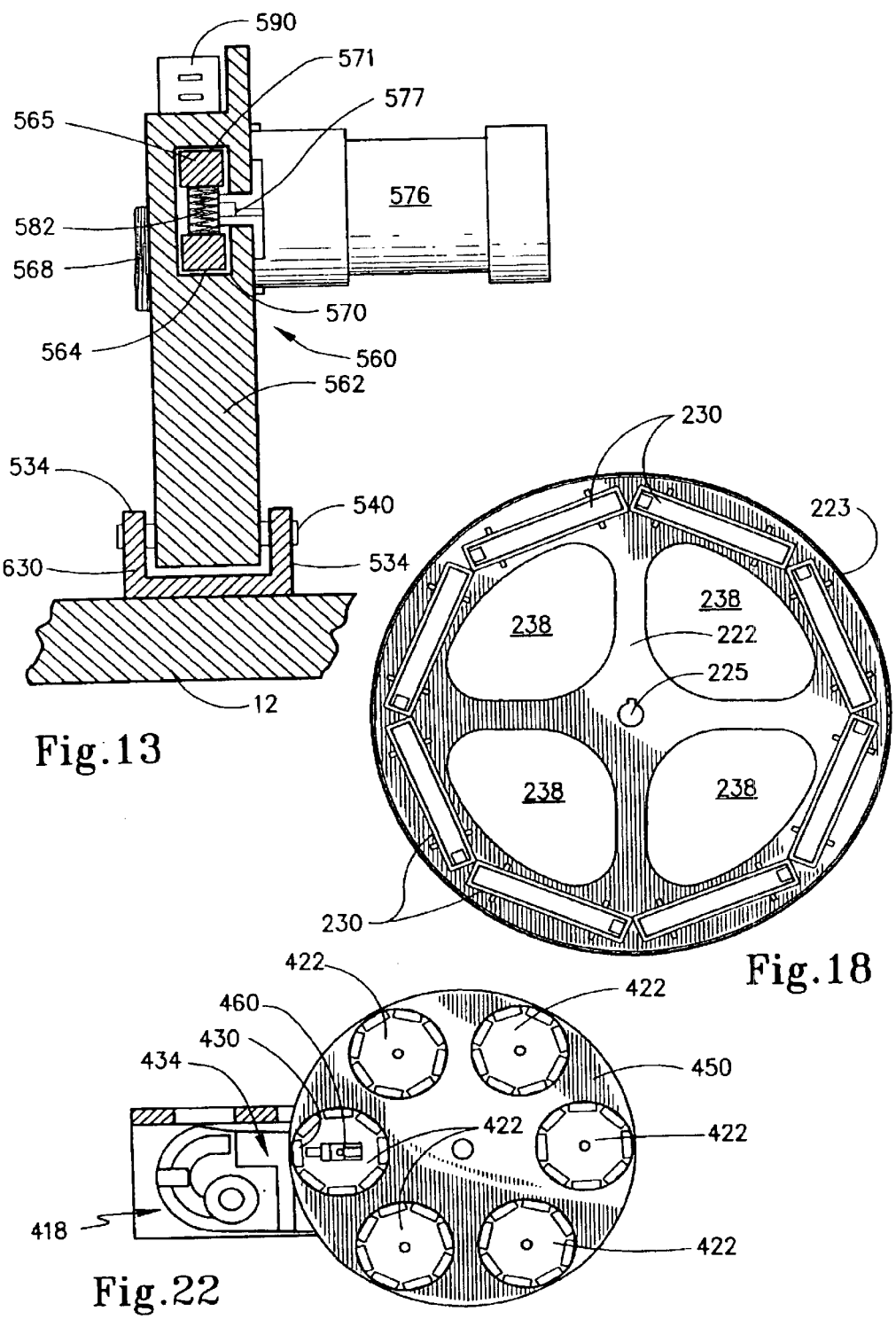

MEDIA CAROUSEL CHANGER FOR DATA SYSTEMS

FIELD OF THE INVENTION

The present invention broadly relates to data systems wherein information is stored on a recording medium, such as magnetic tape and the like. More particularly, however, the present invention is directed to a media carousel changer which can automatically and selectively mount cassettes containing the recording medium and data onto a recorder/reader. This invention specifically concerns a media carousel changer that makes available a plurality of data containing cassettes which can rapidly and efficiently be input into a computer system. The invention also includes automated processes for mounting, reading and demounting media cassettes.

BACKGROUND OF THE INVENTION

The advent of the information age has seen an exponential growth in the accumulation and storage of data both for on-line usage as well as for archival purposes. In the early days of the computer, before the advent of magnetic disk and optical storage assemblies, data was typically stored on magnetic tapes, such as reel-to-reel tapes and later, cassette tapes. In a magnetic tape storage device, a magnetic coil is used as a transducer to imprint data magnetically on a moving band of magnetic film; thereafter, when the film is advanced across the transducer, the data may be read and re-input into the processor.

Magnetic tape systems have the advantage in that they are relatively low cost. Moreover, magnetic tape can be erased and rewritten many times Nonetheless, other tape storage media have been developed or are possible. For example, optical tapes and laser tapes may be employed in an effort to increase the density of data stored on the medium.

Nonetheless, because of the low cost, magnetic tape is still a highly desirable format for archiving data where the ability to rapidly access the data is less significant and where capital cost is of concern. Once a magnetic tape has been loaded onto a recorder/reader, the accessibility of the data on the magnetic tape is a function of two variables, the density of storage and the speed at which the tape medium may be transported across and accurately read by the transducer. In the overall archiving of data, though, the speed at which the magnetic tape is physically mounted onto and de-mounted from the recorder/reader has great significance. Since manual loading of the tape onto the recorder/reader can be very time consuming, there has been a need for automated library systems for magnetic tapes, either in the form of reels or cassettes.

There are certain difficulties, however, that confront efforts to automate a library of data storage media. On one hand, it is necessary that the cassette or reel be accurately docked by registering and mounting it into the recorder/reader unit. Otherwise, the data on the magnetic tape may not be read, on one hand or, on the other hand, costly damage to the tape media or to the recorder/reader unit may occur.

Once docked, it is necessary that the recording medium be properly threaded through the recorder/reader and, upon completion of the processing, that the recording medium be properly restored into the cassette or onto the tape reel. After completion of this task, it is still necessary to efficiently demount the reel or cassette from the recorder/reader. This sometimes poses difficulties since many recorder/readers include magnetic retainers that help seat a ferromagnetic plate of the cassette or reel for proper mounting. It has proved difficult in the past for automated systems to mechanically break this magnetic coupling when demounting the storage media.

Existing automated systems employ an elevator assembly to mount and demount a cassette into the docking station of a reader. A cassette is advanced in a first translational direction into a region immediately above the docking station but below the threading arm. The elevator assembly then lowers the cassette in a second translational direction into the docking station and the magnetic retainers. As this occurs, the leader block of the cassette is lowered onto and engages an enlargement on the end of the threading arm. To demount the cassette, this procedure is reversed. However, since the elevator assembly raises the cassette in a direction orthogonal to the docking station, substantial force rust be used to break the magnetic coupling between the magnetic retainers of the docking station and the ferromagnetic plates on the cassette.

Accordingly, there remains a need for automated library systems which can access a plurality of modules which store a recording medium so as to mount and demount those modules into a recorder/reader. Such systems need to be capable of accurately docking the recording medium module with the docking station of a recorder/reader and to properly mount the module therein. Such systems must also be able to efficiently demount the module from the recorder/reader and return it to a stored position.

SUMMARY OF THE INVENTION

It is an object of the present invention to provide a new and useful media carousel changer which is adapted to receive a plurality of modules which contain a recording medium so as to mount and demount those modules into the docking station of a recorder/reader.

Another object of the present invention concerns a method for automated mounting, reading and demounting such modules or "cassettes".

It is a further object of the present invention to provide a relatively compact data library system in the form of a carousel that can receive a large quantity of stored data that can be easily accessed by a computer processing system.

Another object of the present invention is to provide a carousel changer for recording media wherein modules containing data may be removed from the storage system while another module is being accessed by the recorder/reader.

Yet another object of the present invention is to provide a carousel library system for recording media that is relatively cost effective while at the same time being reliable and efficient.

In order to accomplish these objects, then, a data retrieval system has a carousel changer adapted to receive modules for a recording medium with this carousel changer being operative to mount and demount those modules into the docking station of a recorder/reader. Here, for sake of description, such modules will be referred to as "cassettes" which is intended to cover any type of module which receives a recording medium for transport and storage.

The media carousel changer according to the present invention, then, broadly includes a support frame on which a turntable is disposed. The turntable is journaled for rotation about a turntable axis, and a plurality of cassette holders are disposed about a periphery of the turntable. Each cassette holder is adapted to receive a respective cassette containing the recording medium. Each cassette holder is further pivotally mounted to the turntable such that each cassette holder is selectively pivotable between an extended position to move its cassette into a docked state and a retracted position to move the cassette into a stored state.

A rotary drive operates to rotate the turntable to consecutively move each of the holders into registration with the docking station of the recorder/reader. An actuator is provided with this actuator movable between a first advanced position and a withdrawn position. When the actuator is advanced into the first advanced position, it operates to pivot a registered one of the cassette holders into the extended position thereby to move the cassette received therein into the docking station and to dock it with the recorder/reader. When the actuator is moved to the withdrawn position, it permits the registered cassette holder to pivot into the retracted position thereby to demount the cassette received therein from the recorder/reader and withdraw it from the docking station to the stored state.

Preferably, the cassette holders each include a catch operative to engage the actuator as it retracts so that the actuator physically moves the registered cassette holder from the docked relation and out of the docking station. Each of the cassette holders may also include a spring element that is operative to bias the cassette holder into the stored state. Preferably, the actuator includes a plunger arm that is operative to reciprocate between the first advanced position and the withdrawn position and a driver operative to selectively reciprocate the plunger arm. A roller is rotatably disposed on a free end of the plunger arm with the roller assembly operative to engage the registered one of the cassette holders. Here, each of the cassette holders may include a ramp structure with the roller assembly attacking the ramp structure when the plunger arm moves towards the extended state. Contact of the roller assembly with the ramp structure therefore is operative to positively urge the registered one of the cassette holders into the docking station. Upon withdrawal, the roller assembly engages a flange on the cassette holder so that mechanical force is supplied by the actuator with this force tending to demount the cassette.

Each of the cassette holders may also include a resilient latch member which is positioned to retain a respective cassette therein. The cassettes have a leader block which is secured to the recording medium thereof and a detent structure which releaseably holds the leader member in a fastened state with respect to the cassette. Here, the latch member is also sized and positioned not only to retain the cassette in the cassette holder but also to bias the leader member into the fastened state.

The invention also includes the methods implemented by the above described apparatus. The method includes the step of placing cassettes in individual cassette holders and advancing the cassette holders past the docking station of a recorder/reader so that they sequentially come into registration therewith. A selected registered cassette holder and cassette is pivoted, preferably through a 90° arc, into the docking station, and the cassette is read. Thereafter, the cassette holder and cassette is pivoted out of the docking station. The pathway is preferably a closed-loop, such as circular. Another cassette holder that is not registered may be pivoted to an intermediate load/unload position so that a cassette may be replaced, for example, while a registered and docked cassette is being read.

These and other objects of the present invention will become more readily appreciated and understood from a consideration of the following detailed description of the exemplary embodiments when taken together with the accompanying drawings, in which:

BRIEF DESCRIPTION OF THE DRAWINGS

FIG. 3 is a partial side view in cross-section showing the media carousel changer of the data retrieval system of FIGS. 1 and 2 with a second cassette in an intermediate load/unload position;

FIG. 4 is a perspective view showing a front side of a cassette holder used in the present invention;

FIG. 5 is a front elevational view showing the cassette holder of FIG. 4 mounted on the turntable and receiving a respective cassette therein;

FIG. 6 is a side view in elevation, partially broken-away, showing a registered cassette holder in a retracted position with its respective cassette in a stored state and with the actuator arm at the beginning of the mounting/demounting cycle;

FIG. 7 is a side view in elevation, similar to FIG. 6, but showing the actuator arm moving onto the cassette holder to urge it into the extended position so that its respective cassette is in a docked state;

FIG. 8 is a side view in elevation, partially broken-away, showing the initial demounting of a cassette in a cassette holder from the docked state according to the present invention;

FIG. 13 is a cross-sectional view of the actuator of FIGS. 12(a) and 12(b) taken about lines 13—13 of FIG. 12(a);

FIG. 18 is a top plan view showing the carousel of FIG. 17;

FIG. 22 is a top plan view of the cassette library apparatus and turret structure shown in FIG. 21.

DETAILED DESCRIPTION OF THE EXEMPLARY EMBODIMENTS

Figure 1:
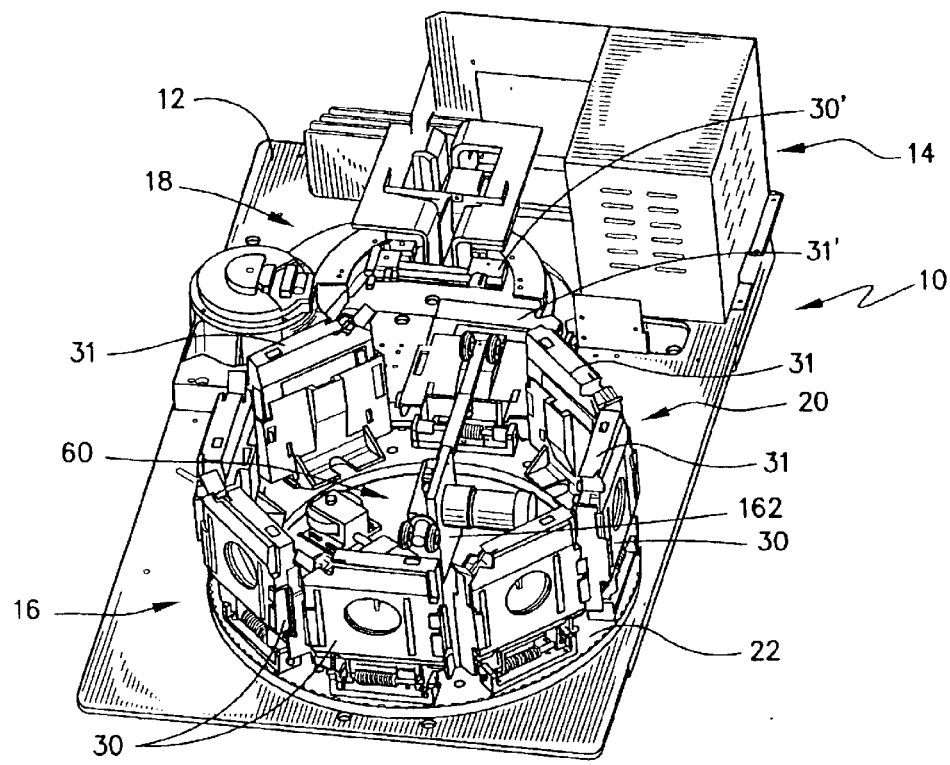
FIG. 1 is a perspective view of a first exemplary embodiment of the data retrieval system of the present invention including a recorder/reader and a media carousel changer with a first cassette in a docked position.

The present invention broadly is directed to a data storage and retrieval system that is operative to retrieve data stored on a recording medium. While this invention is described in reference to a magnetic tape recording medium, it should be understood that the present invention contemplates the use of other tape-like storage media, such as optical tapes, laser tapes and the like, within its parameters. Further, the data storage apparatus of the present invention is particularly directed to a media carousel changer that is adapted to receive a plurality of cassettes containing a recording medium. Here, the term "cassette" should be interpreted to mean not only traditional cassettes, but any other module for holding the recording medium, including reels, cartridges and the like. The invention also is directed to methods implemented by the apparatus.

Broadly, the data storage apparatus of the present invention includes a support frame which supports a data recorder/reader that is operative to receive a recording medium cassette so that the recording medium may be transported across a transducer that reads data from the recording medium. The invention also includes a media carousel changer, as more thoroughly described below, that forms a carousel library of cassettes available for rapid access by the recorder/reader. It should be noted that the recorder/reader used in conjunction with the media carousel changer of the present invention is specially constructed to have a docking region that is not enclosed. As noted in the background section of this specification, standard docking stations employ an elevator assembly. The threading arm is located on an opposite side of a mounted cassette from the magnetic retainers. This structure is typically enclosed in a housing. The elevator assembly inserts a cassette into the housing and then moves the cassette orthogonally onto the docking station. This requires two separate positioning translations.

The preferred recorder/reader with which the present invention is designed employs a threading arm that is underneath the mounted cassette; that is, the threading arm is on the same side of the cassette as the magnetic retainers. The threading arm has an orthogonally projecting pin or roller that terminates in a free end. This structure is not enclosed in a housing. Therefore, a cassette can be smoothly pivoted between mounted and demounted states. This avoids the bi-directional translation mechanism of an elevator assembly.

It should further be understood that the media carousel changer of the present invention is disposed on the support frame so that it may rotate about a carousel axis. This carousel includes a turntable that supports a plurality of cassette holders each of which receives a respective cassette. A rotary drive rotates the carousel to consecutively move each of the holders into registration with the docking station on the recorder/reader, and an actuator advances a retracts to pivotally mount and demount the registered cassette holder in the recorder/reader.

Figure 2:
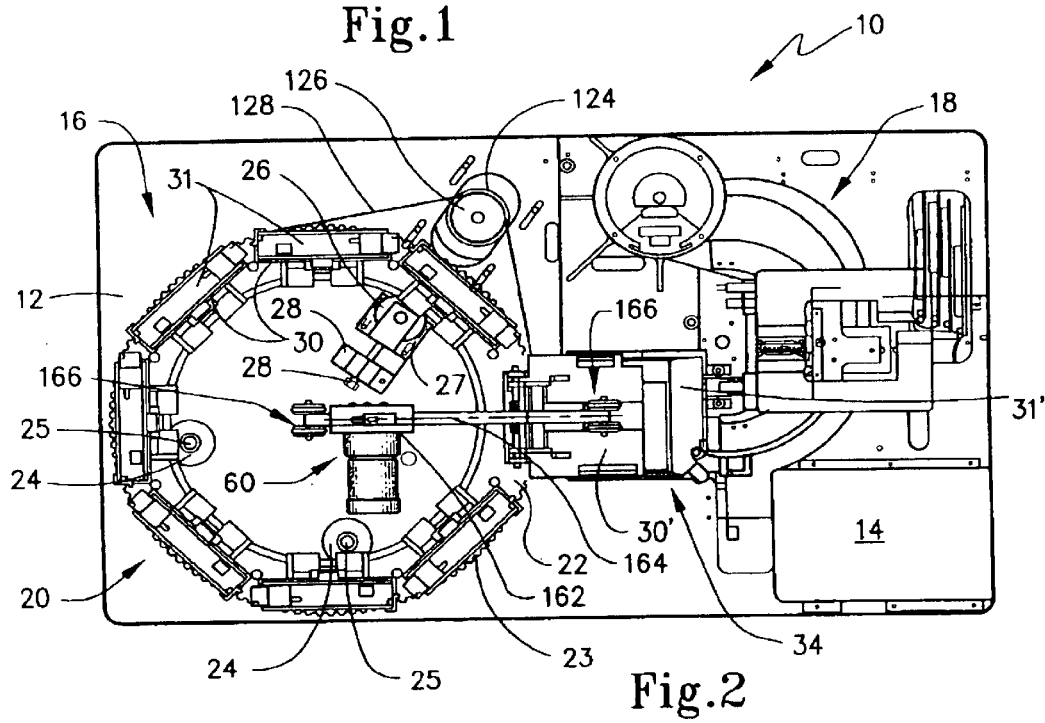
FIG. 2 is a top plan view showing the data retrieval system of FIG. 1.

With this background in mind, the data retrieval system and, in particular, the media carousel changer according to the first exemplary embodiment of the present invention is best shown in FIGS. 1–3. In FIG. 1, data retrieval system 10 incudes a support frame that, for example, has a base plate 12. This support frame supports a cooling fan system 14 and a recorder/reader 18. A carousel library system 16 is disposed on the support frame. While references are made in this description to a recorder/reader 18, it should also be appreciated that the same may be a recorder, a reader or both, without departing from the scope of this invention.

With reference to FIGS. 1–4, it may be seen that the carousel library system 16 includes a carousel 20 that is journaled for rotation about a carousel axis "X". Carousel 20 includes a turntable 22, a plurality of cassette holders 30 and suitable mounts for the cassette holders 30 to pivotally mount cassette holders 30 to turntable 22. Turntable 22 is in the form of an annulus and is rotatably supported on base plate 12 by means of a trilogy of guide wheels, as best shown in FIG. 2. A pair of guide wheels 24 are rotatable on shafts 25 while a third guide wheel 26 is received in a slide bracket 27 that is positionable by a screw adjuster 28. Movement of slide bracket 27 permits mounting, removal and positional adjustment of turntable 22. When mounted, turntable 22 is supported in parallel spaced relation to base plate 12 and is rotatable about carousel axis "X" by means of a motor 124 that has a toothed gear 126. A toothed drive belt 128 extends around gear 126 and the outer peripheral edge 23 of turntable 22. To this end, it should be understood that edge 23 of turntable 22 is toothed to receive belt 128.

A plurality of cassette holders 30 are disposed about turntable 22 with each cassette holder 30 being adapted to receive a respective cassette 31 that contains a recording medium. Such cassettes may be of any type known in the art. To that end, the present invention is particularly adapted, for example, to be used with 3480, 3490, 3490E and 3590E compatible cassette cartridges manufactured by the 3M Corporation of Minneapolis, Minn. As described more thoroughly below, each cassette holder 30 is pivotally mounted to turntable 22 so that the cassette holder 30 may be selectively pivoted between an extended position and a retracted position.

With reference to FIGS. 2 and 3, it may be seen that recorder/reader 18 includes an open docking station 34 which comprises a region that receives a cassette 31 while it is received in its respective cassette holder 30 so that the recording medium may be accessed. In FIGS. 1 and 2, a registered one of the cassette holders 30' is in the extended position with its respective cassette 31' in the docked position. Here, cassette 31' is oriented to be accessed by recorder/reader 18. In FIG. 3, no cassette is in the docking station 34. However, a cassette holder 30" and its cassette 31" are in an intermediate "load/unload" position for convenient loading and unloading of cassette 31" from the library apparatus 20.

With reference especially to FIG. 2, it should be appreciated that motor 124, by rotating turntable 22, is operative to rotate turntable 22 so as to consecutively move each of cassette holders 30 into registration with docking station 34. As discussed more thoroughly below with reference to FIG. 8, recorder/reader 18 includes a magnetic retainer 35 that helps keep and retain the cassette 31 in the docked relation with the cassette 31 having a ferromagnetic piece to couple with the magnetic retainer.

The structure and mounting of cassette holders 30 may best be seen in reference to FIGS. 2–5. In FIGS. 2 and 3, it may be seen that cassette holders 30 are disposed equiangularly around the periphery of turntable 22. As is shown in FIGS. 4 and 5, each cassette holder 30 defines a housing formed by a front wall 40, a pair of end walls 42, 44 and a bottom wall 46. A pair of inwardly turned lips 43 and 45 extend from end walls 42, 44, respectively, and are opposed to one another in spaced relation to front wall 40. A pair of arms 47 (see also FIGS. 6–8) extend upwardly at the rear of bottom wall 46 to complete the cassette housing. Thus, the back of cassette holder 30 is open. As is shown in FIG. 5, cassette 31 is then received in this housing structure. Arms 47 are angular to match the chamber on a cassette 31. Thus, arms 47 prevent a cassette 31 from being improperly installed in holder 30 since a cassette 31 will only mate with a cassette holder 30 when properly oriented.

Cassette holder 30 is pivotally secured to turntable 22 by means of an axle pin 50, as is best shown in FIG. 5. Axle pin 50 is received by ears 52 that depend downwardly from bottom wall 46 and which includes bores, such as bore 53. When inserted through ears 52, axle pin 50 defines trunnions 54 that are pivotally received in trunnion brackets 56 secured to turntable 22. Accordingly, as is shown in FIG. 2 and FIGS. 6–8, each of cassette holders 30 may pivot between an extended position, such as shown with respect to the docked cassette holder 30 in FIG. 2 and FIGS. 7 and 8, to a retracted position shown in FIGS. 5 and 5. Spring element 58 is employed to bias cassette holders 30 into the retracted position.

With reference now to FIGS. 2, 3 and 6–8, it may be appreciated that cassette holders 30 may be selectively moved between the retracted position wherein the cassette holder 30 is upright with respect to turntable 22 to an extended position wherein the cassette 31 received therein may be in a docked relation with respect to the recorder/reader 18. Also in reference to FIG. 3, it may be seen that a cassette holder that is diametrically opposite docking station 34 may be selectively moved to an intermediate load/unload position wherein a cassette may be loaded into or removed from carousel 20 of carousel library system 16.

In FIGS. 1–3, it may be seen that an actuator 60 is supported by mounting block 162 to base plate 12 so that it is located in a central region surrounded by the set of cassette holders 30 where they are in the stored position. Preferably, mounting block 162 is radially spaced from carousel axis "X" so as to be closer to docking station 34. Actuator 60 is movable between a first advanced position shown in FIGS. 2 and 7 to an opposite second advanced position shown in FIG. 3 through a withdrawn position.

Figure 9:
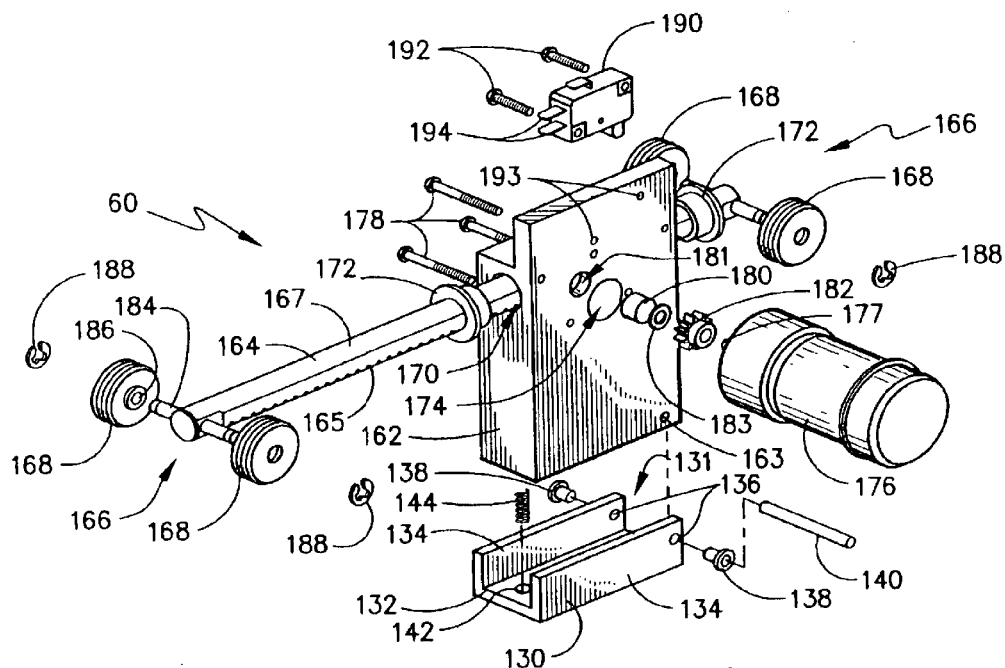
FIG. 9 is an exploded view in perspective of the actuator of the present invention which is shown in FIG. 2.

The structure of actuator 60 is best shown in FIG. 9, but reference may also be made to FIGS. 2 and 3 to show the structure and operation thereof.

With reference then to these figures, it may be seen that actuator 60 includes mounting block 162 that has an elongated passageway 170 of circular cross-section extending therethrough. Plunger arm 164 is reciprocally disposed in passageway 170 by means of a pair of bushings 172. A bore 174 also extends through mounting block 162 and intersects passageway 170. A motor driver 176 in the form of a reversible motor then is mounted to mounting block 162 by means of a plurality of screws 178 so that shaft 177 of driver 176 extends into bore 174.

Shaft 177 supports a gear 182 that is positioned alongside passageway 170. Gear 182 engages rack gear teeth 165 located along one side of plunger arm 164.

An anti-rotation plug 180 is inserted through opening 181 and held in position so that it abuts flat surface 167 on rack 164. Spring washer 183 is sandwiched between motor 176 and anti-rotation plug 180 to apply force causing plug 180 to bear against flat surface 167. This minimizes rotational movement of rack 164 in passageway 170. As motor driver 176 is reversibly driven, plunger arm 164 may be reciprocally driven between a first advance position (shown in FIG. 2) and a second advance position (shown in FIG. 3) through a withdrawn or intermediate position with little or no rotation.

Mounting block 162 is secured to base plate 12 by means of a channel piece 130. Channel piece 130 includes a bottom wall 132 fastened in any convenient manner to base plate 12 and includes a pair of parallel, spaced apart sidewalls 134 that are opposed to one another to define a channel 131 therebetween. Each of sidewalls 134 has an opening 136 at one corner thereof with openings 136 being sized to receive a retaining pin 140 received through bushings 138. Mounting block 162 fits within channel 131 and includes a bore 163 through which retaining pin 140 is inserted. Thus, mounting block 162 can pivot slightly within channel 131. Bottom wall 132 of channel piece 130 has an opening 142 at an end opposite openings 136 in sidewalls 134. When channel piece 130 is fastened to base plate 12, opening 142 defines a seat for a biasing spring 144. Biasing spring 144 tends to pivot mounting block 162 away from bottom wall 132 on an axis formed by retaining pin 140. As described below, this structure, including biasing spring 144, assists in docking a cassette 31.

As noted above, each opposite end of plunger arm 164 is provided with a roller assembly 166. Each roller assembly 166 includes a pair of plastic rollers 168 which are rotatably journaled on a transverse axial pin 184 with bearings 186 and are held in position on axial pin 184 by means of C-clips 188.

A position sensor 190 is also secured to mounting block 162 by means of screws 192 which extend into holes 193 on mounting block 162. Position sensor 190 monitors the reciprocal positioning of plunger arm 164 and is provided with electrical contacts 194 for outputting this data.

Turning again to FIG. 6, it may be seen that each cassette holder 30 includes a ramp structure 70 having an inclined face 72 disposed on front wall 40. Ramp structure 70 interacts with roller assembly 166 to help urge a registered one of the cassette holders into the docking station 34 whereby the cassette 31 received in the registered cassette holder 30 is positively urged into the docked reletion with recorder/reader 18. Moreover, the contact of roller assembly 166 with ramp structure 70 creates a force moment that acts to pivot mounting block 162 on retaining pin 140 against the restorative force of spring 144. Thus, spring 144 resiliently biases the registered cassette holder orthogonally into the docking station 34.

To more fully understand this operation, it should be appreciated that turntable 22 is supported for rotation about axis "X" by guide wheels 24, 26.

Rotational drive is provided by motor 24 and belt 128. Thus, motor 24 consecutively moves each of cassette holders 30 into registration with the docking station 34. Registration occurs when the cassette holder is in a position such that if it is pivotally moved into the extended position, cassette 31 will move into a docked state in docking station 34. Once a registered one of cassette holders 30 is registered, actuator 60 may be operated to move plunger arm 164 from the withdrawn position shown in FIG. 3 to the advanced position shown in FIG. 2 thereby to move the cassette 31 of the registered one of the cassette holders 30 into the docking station 34.

This operation may further be seen with reference to FIGS. 6 and 7. In FIG. 6, it should be appreciated that roller assembly 166 moves toward cassette holder 30 in the direction of arrow "B". Rollers 168 will engage front wall 40 at a location at the base of inclined face 72. Further advancement of plunger arm 164 causes the cassette holder 30 to pivot from the upright, stored position shown in FIG. 6, to the extended position shown in FIG. 7. As this happens, roller assembly 166 rolls upwardly on inclined face 72 of ramp structure 70 thereby applying pressure that urges cassette 31 positively into the docked relation with recorder/reader 18. This action also pivots mounting block 162 against the restorative force of spring 144.

Withdrawal of plunger arm 164, in the direction of arrow "C" in FIG. 8, allows cassette holder 30 to pivot from the extended position in docked relation to the stored relation due to the biasing of spring element 58. However, as is also noted above, docking station 34 is provided with a magnetic retainer 36. Thus, spring element 58 is usually not sufficient alone to break the magnetic bond between cassette 31 and magnetic retainer 36. Thus, as is shown in FIG. 8, cassette holder 30 is provided with a flange 74 that extends from front wall 40 in a common direction as ramp structure 70. Flange 74 has a cut-out 76 sized and adapted to extend around plunger arm 164 as is shown in FIG. 8. Flange 74 defines a catch that is operative to engage actuator 60, and specifically roller assembly 166, when the actuator 60 retracts.

Thus, as is shown in FIG. 8, when plunger arm 164 is retracted in the direction of arrow "C", rollers 168 contact flange 74. When this happens, continued mechanical retraction of plunger arm 164 physically and forcefully pivots cassette holder 30, independently of spring element 58, to urge cassette holder 30 toward the stored position and thus out of the docked relation with respect to docking station 34. This mechanical action assists in breaking any magnetic bond between magnetic retainer 36 and the associated ferromagnetic piece, (such as the iron disk) on cassette 31. This then demounts cassette 31 from the recorder/reader 18.

With reference now to FIGS. 4, 5 and 10(a)–10(c), further structure of cassette holder 30 may be now appreciated. As is shown in these figures, each cassette holder 30 is constructed of molded, fiber-filled plastic and includes a resilient latch member 80 formed by an elongated blade portion 82 and a generally triangularly shaped head 84 disposed at a distal end thereof. Blade 82 is secured, at its proximal end, to end wall 44 and may be molded as an integral extension thereof. As described below, latch member 80 is constructed to interact with a leader member secured to the magnetic recording medium of cassette 31.

Figure 10A:
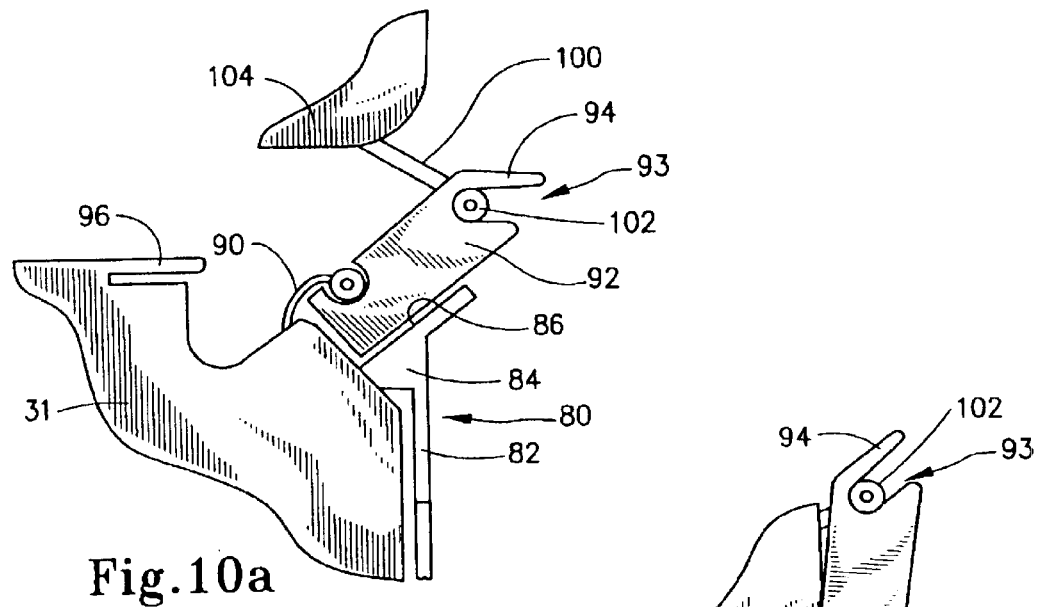
FIGS. 10(a), 10(b) and 10(c) are front views in elevation of a portion of a cassette showing the detent structure and the interaction of the latching structure of the present invention with a leader member thereof.
Figure 10B:
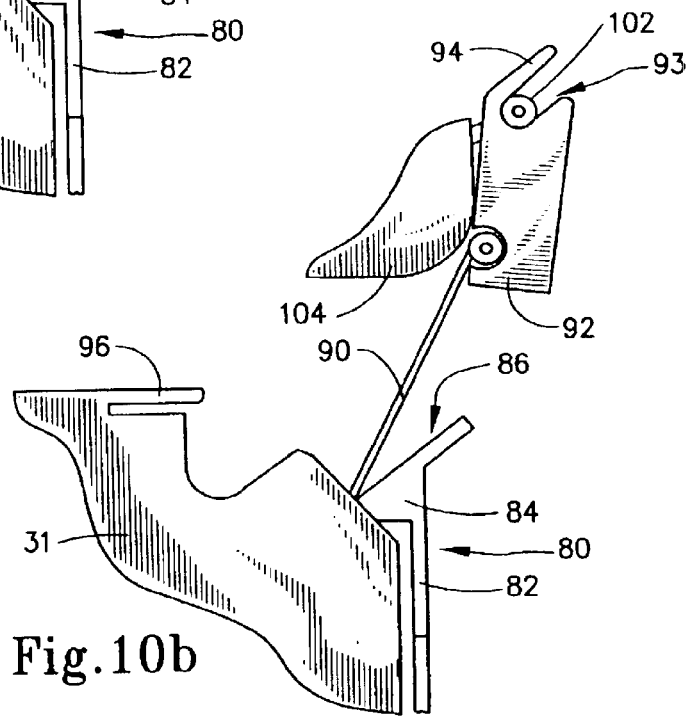
Figure 10C:
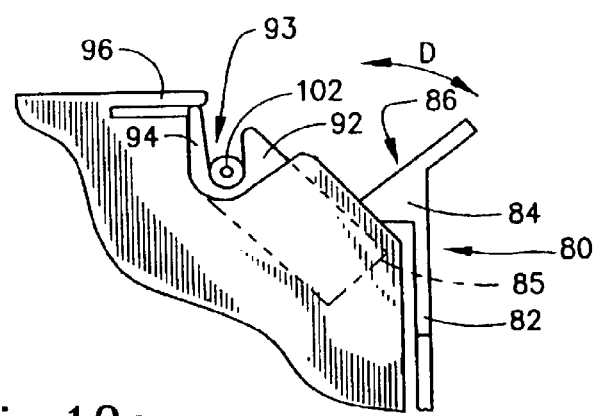

Specifically, in reference to FIGS. 10(a)–10(c), it may be seen that cassette 31 includes a recording medium in the form of magnetic tape 90 which is secured to a leader block 92. Leader block 92 is provided so that an automatic threading arm 100 may be employed to automatically thread tape 90 through recorder/reader 18. To this end, threading arm 100 is provided with a roller 102 at a distal end thereof which engages leader block 92, as is shown in FIGS. 10(a)–10(c). As is shown in these figures, leader block 92 includes a channel 93 that is sized and adapted to receive the roller 102 on the end of threading arm 100. Thus, channel 93 defines a finger 94 at a free end of leader block 92. FIG. 10(c) shows leader block 92 in a fastened state with respect to cassette holder 31. Here, leader block 92 is substantially contained within cassette holder 31 and is held in position by means of a prong 96 that resiliently engages finger 94 to define a detent that releasably holds leader block 92 in the fastened state.

As threading arm 100 is operated, leader block 92 is initially withdrawn out of cassette 31, as is shown in FIG. 10(a). Thereafter, as is shown in FIG. 10(b), threading arm 100 moves to advance leader block 92 and tape 90 across tape support 104. Tape support 104 is preferably any suitable air bearing, such as that described in my co-pending application Ser. No. 08/607,638, a roller support or other tape support as known in the art.

When tape 90 is rewound, this process s reversed and leader block 92 moves toward the position shown in FIG. 10(c). However, in the past, it has been found that leader block 92 does not always move into the fully fastened state so that withdrawal of cassette 31 from the docked relation is impaired. Damage to cassette 31, tape 90 or the recorder/reader mechanism can even occur when this happens. With the present invention, though, latch member 80 assists in returning leader block 92 to the fastened state, shown in FIG. 10(c). To this end, it may be seen that head 84 forms a guide ramp 86 that helps guide leader block 92 therealong. As leader block 92 moves toward the fastened state, it pivots around nose 85, shown in phantom in FIG. 10(c) (see also FIG. 4), so that leader block 92 pivots into cassette 31. Since blade 82 is formed of a resilient fiber-filled plastic material, latch member 80 may pivot in the direction of arrow "D". This resiliency provides a restoring force assisting threading arm 100 in overcoming the force of prong 96 so that leader block 92 becomes engaged thereby.

Figure 11:
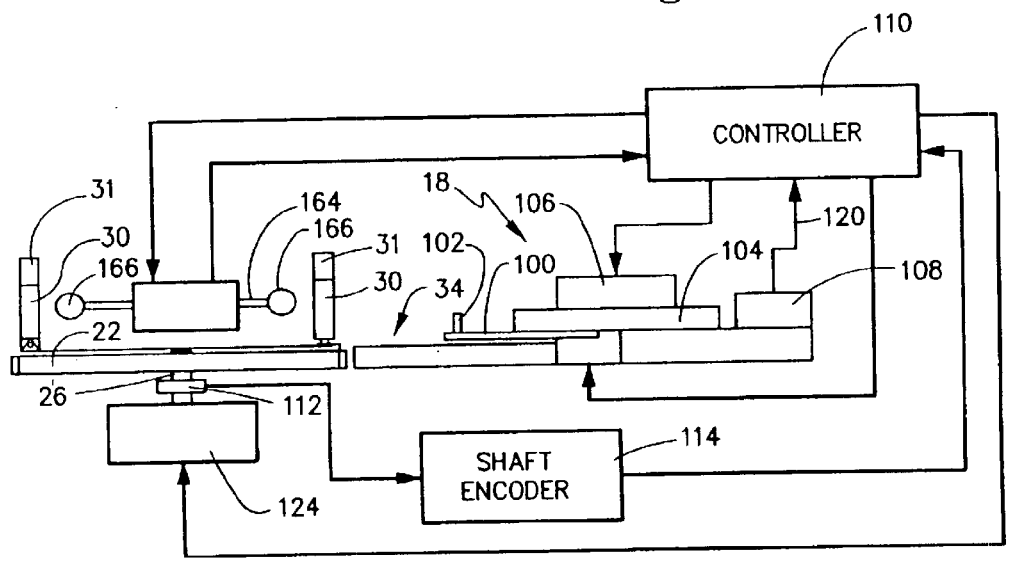
FIG. 11 is a diagrammatic view showing the data retrieval system and cassette library apparatus according to the present invention.

The overall operation of the data retrieval system 10 and cassette library system 16 or carousel 20 according to the present invention may now be more fully appreciated with reference to FIG. 11 which is a diagrammatic view of this structure and a microprocessor controller 110. As is shown in FIG. 11, controller 110 operates to generate a controlling signal that is supplied to motor 124 that operates to rotate shaft 126 and therefore turntable 22. Rotational position is determined, in any convenient manner, such as by a sensor 112 and a shaft encoder 114 which communicates back to controller 110 so that controller 110 monitors the rotational position of turntable 22 and thus the consecutive registration of cassette holders 30 with docking station 34. When a desired cassette holder 30 is in a registered state, controller 110 stops motor 124 and sends a signal to actuator 60 which causes plunger arm 164 to be advanced against the registered cassette holder 30, as described above.

Actuator 60 is provided with suitable sensors, as is known in the art, that communicate back to controller 110 to signal controller 110 as to whether actuator 60 is in the advanced or retracted position. The registered one of cassette holders 30 is therefore moved into docking station 34 at which time controller 110 signals recorder/reader 18 to activate threading arm 100 to thread tape 90 around tape support 104, as is known in the art. Thereafter, cooperating motors, including motor 106, drive tape 90 for advancement past transducer 108. This motor drive is of a suitable type known in the art. As tape 9C moves past the transducer 108, retrieved data is in the form of a signal at 120 that is either presented to controller 110 but ultimately to a computer system or other processor for processing the data that has been stored on magnetic tape 90. Upon completion of the data reading operation, the tape rewinds and is demounted by the retraction of plunger arm 164, and the process may be repeated. Here, also, it may be appreciated that an operator may replace a selected cassette during the interval that another cassette is mounted on recorder/reader 18.

Figure 12A:
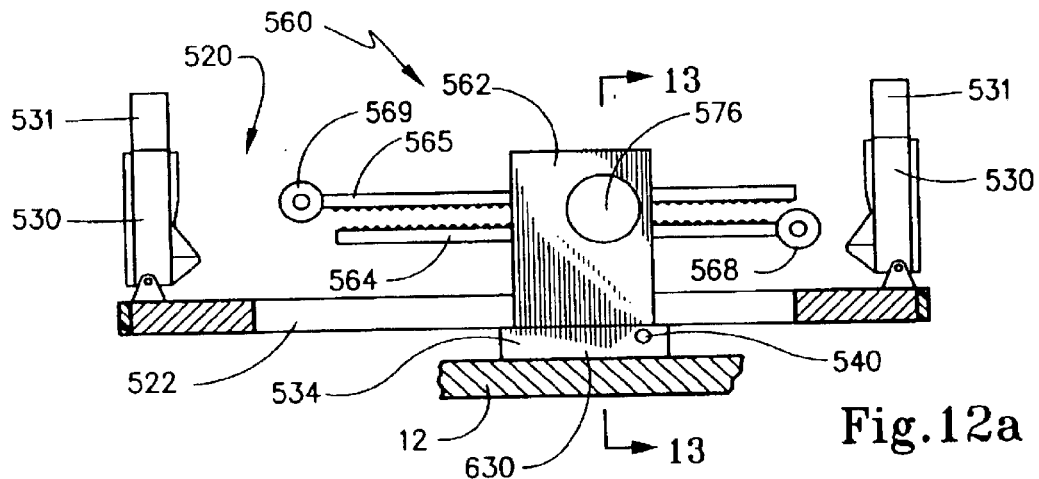
FIGS. 12(a) and 12(b) are cross-section diagrams of the carousel changer of the present invention with an alternative embodiment of the actuator shown, with the cassettes in position for rotational advancement (FIG. 12(a)) and with two opposite cassettes respectively in a docked position and an intermediate load/unload position (FIG. 12(b))
Figure 12B:
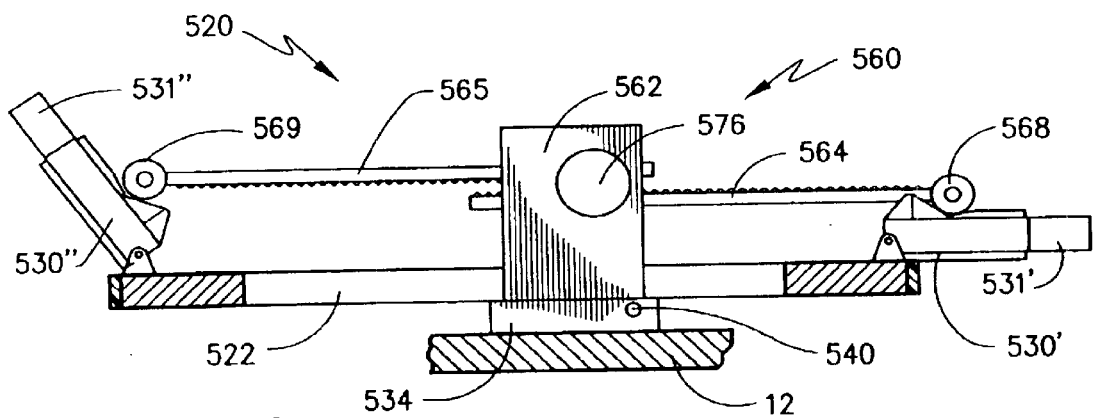
Figure 17:
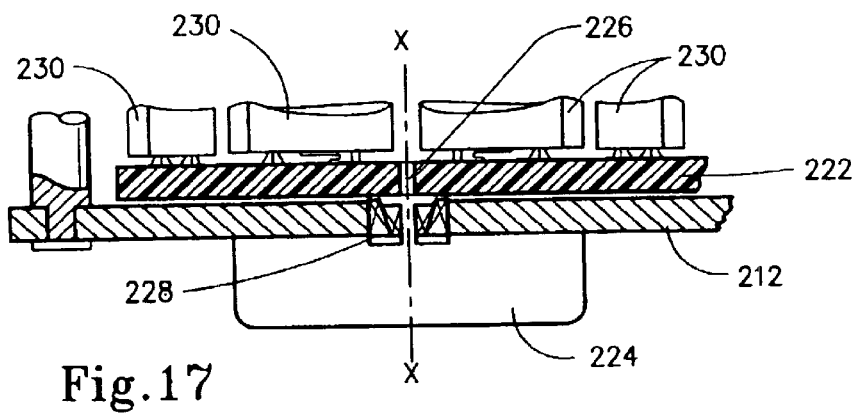
FIG. 17 is a cross-sectional view of the motor drive and carousel of the second embodiment of the present invention.
Figure 14:
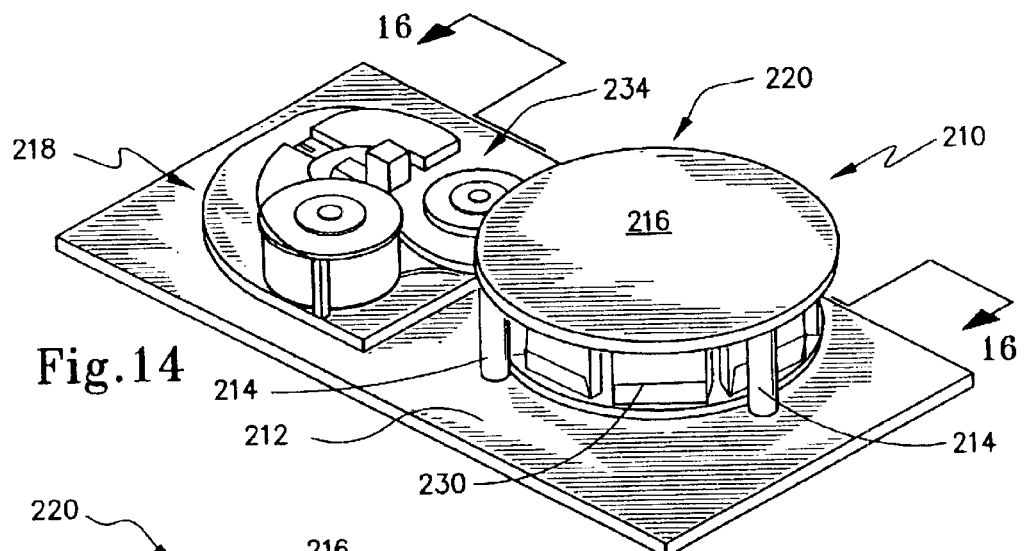
FIG. 14 is a perspective view of a second exemplary embodiment of the data retrieval system of the present invention.
Figure 15:
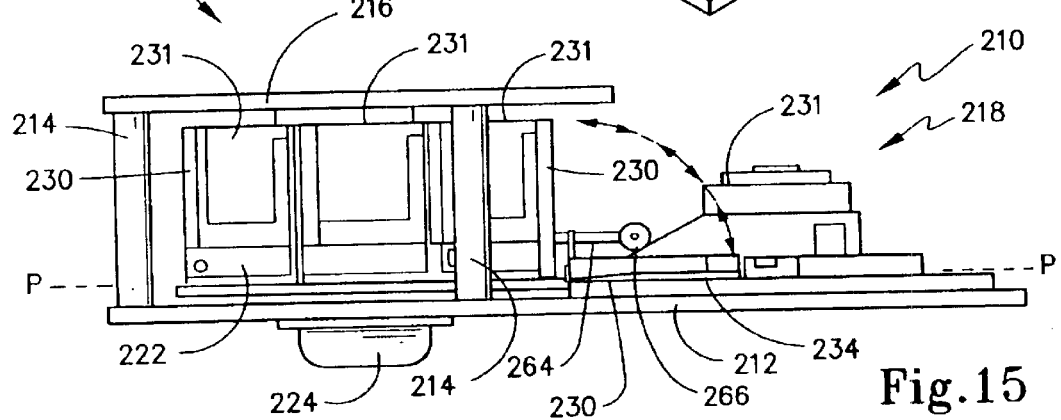
FIG. 15 is a side view in elevation showing the data retrieval system of FIG. 14.
Figure 16:
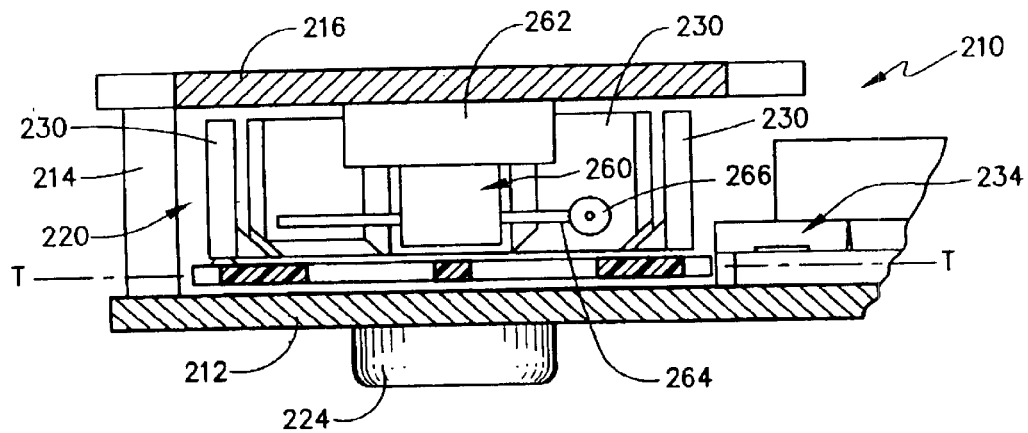
FIG. 16 is a cross-sectional view taken about lines 16—16 of FIG. 14.

An alternative embodiment of the actuator is shown in FIGS. 12(a), 12(b) and 13. As is shown in these figures, actuator 560 is mounted on base plate 12 by channel piece 630 so as to be positioned generally in a central region of carousel 520. Carousel 520 includes an annular turntable 522 that is the same as described above with respect to turntable 22. Actuator 560 includes a mounting block 562 which is pivotally received on pin 540 that extends between sidewalls 534 of channel piece 630 in a manner identical to that described above. Actuator 560 is operative to move a pair of opposite cassette holders 530 so that one of the cassette holders moves into the extended position so that its associated cassette 531 will be in a docked state whereas the other cassette holder 530 is moved into the intermediate load/unload position.

It should be understood that actuator 560 is able to accomplish this movement simultaneously so that, while one cassette is being accessed by the recorder/reader 18, the opposite cassette may be removed from carousel 520 and be replaced with a new cassette to be read. Thus, as is shown in FIG. 12(a), each of cassette holders 530 are shown in a retracted position with the associated cassettes 531 being stored. Actuator 560 includes a pair of plunger arms 564, 565 respectively received through passageways 570, 571. A gear 582 is disposed on shaft 577 of motor drive 576 and engages facing rack teeth on each of plunger arms 564, 565. Reversible activation of motor drive 576 causes plunger arms 564, 565 to reciprocate in opposite directions between first and second withdrawn positions, shown in FIG. 12(a), to first and second advanced positions, shown in FIG. 12(b).

Plunger arm 564 rotatably receives a roller assembly 568 at one end thereof so that, as is shown in FIG. 12(b), when it is moved to the first advanced state, it contacts a cassette holder 530' to move cassette holder 530' from the retracted position to the extended position. Simultaneously, activation of motor drive 576 moves plunger arm 565 to the second advanced position so that its associated roller assembly 569 contacts cassette holder 530" to move it into an intermediate load/unload position so that cassette 531" may be loaded or unloaded from carousel 520. Opposite movement of motor drive 576 moves each of plunger arms 564, 565 back to the withdrawn position shown in FIG. 12(a) so that carousel 520 may be rotatably driven to register different ones of cassettes 531 with the docking station.

A second exemplary embodiment of the present invention is shown in FIGS. 14–18. In this second exemplary embodiment, data retrieval system 210 includes a support frame having a base plate 212, a plurality of upright posts 214 and a mounting plate 216. The support-frame supports a recorder/reader 218 and a cassette library system includes a carousel 220 having a turntable 222 that is journaled for rotation about a turntable axis "X". A rotary drive in the form of motor 224 has a keyed shaft 226 which extends through base plate 212 and which is fastened to turntable 222. Shaft 226 is rotatably received by bearings 228 mounted in base plate 212. Motor 224 is therefore operative to rotate turntable 222 about axis A plurality of cassette holders 230 are equiangularly disposed about the periphery 223 of turntable 222 with each cassette holder 230 being similar to cassette holders 30. Moreover, each cassette holder 230 is pivotally mounted to turntable 222 in a manner similar to that described above. In FIG. 18, it may be seen that turntable 222 is provided with a plurality of cut-out regions 238 to reduce the weight thereof.

Recorder/reader 218 includes a docking station 234. Here again, when cassette holder 230 is registered with docking station 234, pivoting of the cassette holder 230 moves a respective cassette 213 into a docked position in the docking station 234. Likewise, when the cassette holder 230 is moved into the retracted position, the corresponding cassette 231 moves into a stored state.

With reference to FIGS. 15 and 16, it may be again seen that movement of the cassette holder 230 and its corresponding cassette 231, when in the registered orientation, is accomplished by means of an actuator 260 that is supported by mounting block 262 secured to mounting plate 216 so that it is located centrally of the set of cassette holders 230 when they are in the stored position. Actuator 260 may be structured similarly to actuator 260, but here has only a single roller assembly 266 secured at one end thereof. Actuator 260 is movable between the advanced position shown in FIG. 15 and a withdrawn position shown in FIG. 16.

An advantage of the system shown with respect to the second exemplary embodiment is in the direct mechanical connection of turntable 222 to keyed shaft 226 of motor 224 by means of keyway 225 (see FIG. 18). This interconnection eliminates the belt drive as well as guide wheels 24 and 26. Due to the directive drive, however, it is necessary that actuator 260 be depended centrally of carousel 220 without the connection to base plate 212.

With reference again to FIGS. 1–3 and 14–16, it may be seen that, in the first and second exemplary embodiments of the present invention, the cassette holder 30 is in a first plane "P" when in the docked position. Turntable 22 is in a turntable plane "T" that is substantially parallel to plane "P". However, with respect to a third embodiment shown in FIGS. 19 and 20, the turntable plane is substantially perpendicular to this first plane.

Figure 19:
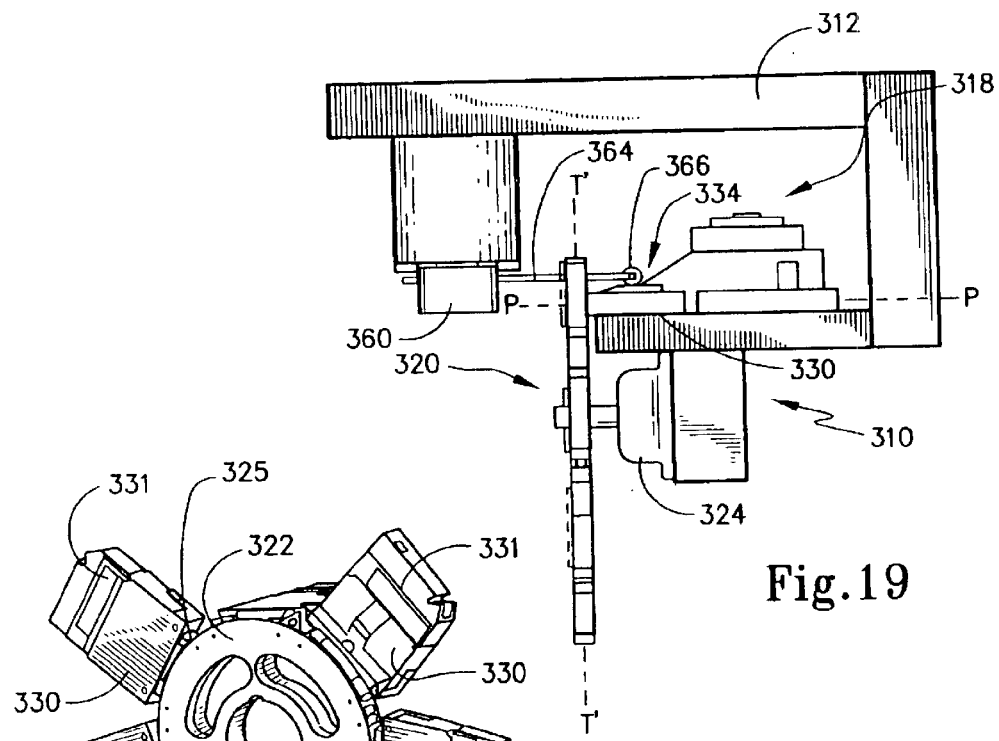
FIG. 19 is a side view of a third embodiment of the present invention showing the turntable oriented perpendicularly to the docking plane of a docked and mounted cassette according to the present invention.
Figure 20:
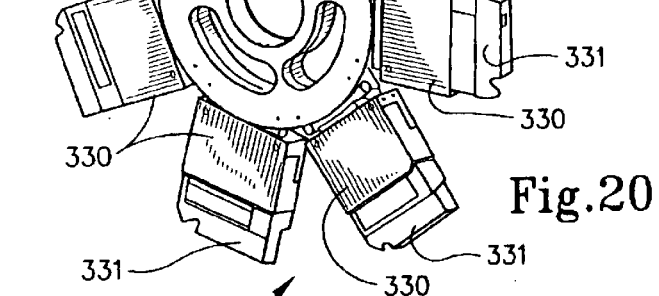
FIG. 20 is a perspective view of the turntable and cassette holders according to the third exemplary embodiment of the present invention.

With reference, then, to FIGS. 19 and 20, it may be seen that a third embodiment of a data retrieval system 310 includes a support frame 312 that supports a recorder/reader apparatus 318. Recorder/reader apparatus 318 has a docking station 334 to receive a cassette having data stored on a recording medium with the cassettes shown in FIGS. 19 and 20 being the same as those shown in FIGS. 118. Here, however, a cassette library apparatus 320 is provided and includes a turntable 322 which is oriented in a turntable plane "T'" that is substantially perpendicular to plane "P" that is the first plane or docking plane corresponding to the docked position of a cassette holder 330 shown in FIG. 19 in the docked position.

Turntable 322 includes a plurality of cassette holders 330 disposed at equiangular positions around the periphery thereof which each of cassette holders 330 receiving a cassette 331 therein. The structure of cassette holders 330 are identical to that of cassette holders 30, described above. Here, however, each cassette holder is oriented in the turntable plane "T'" instead of being oriented upright in relation thereto. Thus, each cassette holder 330 is mounted to the edge 325 of turntable 322.

Motor 324 is provided to selectively rotate turntable 322 and motor 324 is mounted to framework 312. An actuator 360 is supported by framework 312 and is oriented so that each cassette holder 330 is positioned between actuator 360 and docking station 334 when it is in a registered position. Actuator 360 includes a plunger arm 364 which may be reciprocally driven between an advanced position and a retracted position as described above with respect to actuator 60. Thus, as is shown in FIG. 19, a registered cassette holder 330 may be pivoted into a docked relation with respect to recorder/reader 318 when plunger arm 364 and its associated roller assembly 366 is advanced thereagainst.

Figure 21:
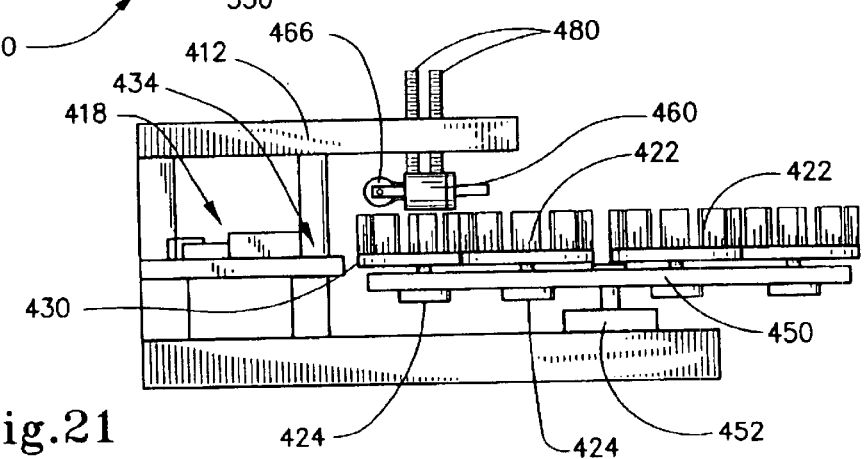
FIG. 21 is a side view in elevation showing a fourth alternative embodiment of the present invention wherein a plurality of turntables are disposed on a turret assembly.

FIGS. 21 and 22 show the essential features of an expanded version of the present invention wherein a cassette library system includes an actuator 460 of the type described above with respect to either the first or secondary exemplary embodiments. Here, however, actuator 460 is mounted on rotatable threaded rods 480 which may be suitably driven so that actuator 460 can be selectively moved upwardly and downwardly with respect to a framework 412, as is shown in FIG. 21. Framework 412 also supports a turret 450 which may be rotatably driven by a motor 452 so as to advance a selected one of turntables 422 into registration with a recorder/reader 418. Thereafter, as is shown in both FIGS. 21 and 22, the registered turntable 422 may be rotated by means of its associated motor 424 to register a selected cassette holder 430 with docking station 434. While this takes place, actuator 460 is moved downwardly so that, upon activation, its roller assembly 466 will attack a selected registered cassette holder 430 to move it into the docked position. A different set of cassette holders, as represented by the different turntables 422, may be accessed by withdrawing plunger 460 from the interior of the respective cassette holders and then rotating turret 450 to a new orientation for a different turntable. The construction of each of turntables 422 and their associated cassette holders, however, is identical to that described with respect to the first exemplary embodiment.

The present invention also includes a method of mounting, reading and demounting cassettes relative to the docking station of the media changer such that the recording medium in each of the cassettes may be selectively accessed by a recorder/reader. The method according to this invention, then, encompasses those processing steps that are accomplished by the above described embodiments of the apparatus of the present invention.

Broadly, the method according to the present invention includes a first step of placing each of a plurality of cassettes in an individual cassette holder therefor. Next, the cassette holders are advanced along a pathway so that the cassette holders and the cassettes therein are sequentially registered with the docking station. The method includes the step of pivoting a registered one of the cassette holders into an extended position thereby to move the cassette received therein into the docking station and into a docked state with respect to the recorder/reader. The method includes the step of reading the cassette in the registered one of the cassette holders when the cassette is in the docked state. The method then includes the step of pivoting the registered one of the cassette holders into a retracted position thereby to demount the cassette received therein from the recorder/reader so that the cassette moves into a stored state.

The method according to the present invention may also include other processing steps. Preferably, the cassette holders are advanced in a closed loop pathway, and it is preferred that this pathway be a circular pathway such as the carousel described above. The step of pivoting the registered one of the cassette holders is preferably accomplished by pivoting the registered one of the cassette holders through an arc angle of about 90° from a position orthogonal to the plane of the docking station and into the plane of the docking station. The method may also include the step of simultaneously pivoting another one of the cassette holders to an intermediate load/unload position when the registered one of the cassette holders is pivoted into the extended position. Further, the method may include the step of replacing the cassette in another one of said cassette holders during a time interval when the cassette in the registered one of the cassette holders is being read.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

We claim:

1. A data retrieval system operative to retrieve data recorded on a recording medium carried by a cassette, comprising:

(a) a support frame;

(b) a recorder/reader having a docking station adapted to matably receive a cassette, said recorder/reader including a transducer operative to read data from the recording medium and a drive system operative to advance the recording medium whereby data thereon is readable by said transducer;

(c) a turntable mounted on said support frame and journaled for rotation about a turntable axis;

(d) a plurality of cassette holders disposed about a periphery of said turntable, each said cassette holder adapted to receive a respective cassette holder adapted to receive a respective cassette containing the recording medium and being pivotally mounted to said turntable such that each said cassette holder is selectably pivotable between an extended position and a retracted position;

(e) a rotary drive operative to rotate said turntable thereby to consecutively move each of said holders into registration with said docking station; and (f) an actuator linearly movable radially of said turntable axis between an advanced position and a withdrawn position, said actuator when advanced operative to pivot a registered one of said cassette holders into the extended position thereby to move the cassette received therein into a docked state in the docking station and to mount onto said recorder/reader and when withdrawn operative to permit said registered one of said cassette holders to pivot into the retracted position thereby to demount the cassette received therein from the reader and move the cassette from the docking station and into a stored state.

2. A media carousel changer adapted to receive a plurality of cassettes containing a recording medium and operative to mount said cassettes into a docking station on a recorder/reader and to demount the cassettes therefrom, comprising:

(a) a support frame;

(b) a turntable disposed on said support frame and journaled for rotation about a turntable axis;

(c) a plurality of cassette holders disposed about a periphery of said turntable, each said cassette holder adapted to receive a respective cassette containing a recording medium and being pivotally mounted to said turntable such that each said cassette holder is selectively pivotable between an extended position and a retracted position, and wherein each of said cassette holders includes a catch;

(d) a rotary drive operative to rotate said turntable thereby to consecutively move each of said cassette holders into registration with said docking station; and (e) an actuator movable between a first advanced position and a withdrawn position, said actuator operative when advanced to pivot a registered one of said cassette holders into the extended position thereby to move the cassette received therein into the docking station and into a docked state with respect to said recorder/reader and operative when withdrawn to engage said catch whereby said actuator physically moves the registered one of said cassette holders from the extend ed position and its respective cassette out of the docked state.

3. A media carousel adapted to receive a plurality of cassettes containing a recording medium and operative to mount said cassettes into a docking station on a recorder/reader and to demount the cassettes therefrom, comprising;
  (a) a support frame;
  (b) a turntable disposed on said support frame and journaled for rotation about a turntable axis;
  (c) a plurality of cassette holders disposed about a periphery of said turntable, each said cassette holder for receiving a respective cassette containing a recording medium and being pivotally mounted to said turntable such that each said cassette holder is selectively pivotable between an extended position and a retracted position;
  (d) a rotary drive operative to rotate said turntable t hereby to consecutively move each of said cassette holders into registration with said docking station; and
  (e) an actuator including a plunger arm, said plunger arm operative to move linearly in a plunger arm plane wherein no portion of said turntable is intersected by the plunger arm plane, said plunge r arm move able between a first advanced position and a withdrawn position and operative when advanced to pivot a registered one of said cassette holders into the extended position thereby to move the cassette received therein into the docking station and into a docked state with respect to said recorder/reader and operative when withdrawn to permit said registered one of said cassette holders to pivot into a retracted position thereby to demount the cassette received therein from the recorder/reader so that said cassette moves to a stored state.

4. A media carousel changer according to claim 3 wherein said turntable is oriented in a turntable plane and said plunger arm plane is parallel to said turntable.

5. A media carousel changer according to claim 3 wherein said turntable is oriented in a turntable plane and said plunger arm plane is orthogonal to said turntable plane.

6. A media carousel changer according to claim 3 wherein each of said cassette holders is oriented parallel to the turntable axis when in the stored position.

7. A media carousel changer according to claim 3 wherein each of said cassette holders is oriented perpendicular to the turntable axis when in the stored position.

8. A media carousel changer adapted to receive a plurality of cassettes containing a recording medium and operative to mount said cassettes into a docking station on a recorder/reader and to demount the cassettes therefrom, comprising;
  (a) a support frame;
  (b) a turntable disposed on said support frame and journaled for rotation about a turntable axis;
  (c) a plurality of cassette holders disposed about a periphery of said turntable, each said cassette holder for receiving a respective cassette containing a recording medium and being pivotally mounted to said turntable such that each said cassette holder is selectively pivotable between an extended position and a retracted position;
  (d) a rotary drive operative to rotate said turntable thereby to consecutively move each of said cassette holders into registration with said docking station; and
  (e) a plunger arm linearly moveable between a first advanced position and a withdrawn position, said plunger arm operative when advanced to pivot a registered one of said cassette holders into the extended position thereby to move the cassette received therein into the docking station and into a docked state with respect to said recorder/reader and operative when withdrawn to permit said registered one of said cassette holders to pivot into a retracted position thereby to demount the cassette received therein from the recorder/reader so that said cassette moves to a stored state wherein said plunger arm includes a roller assembly rotatably disposed on a first free end of said plunger arm, said roller assembly operative to engage said registered one of said cassette holders as said plunger arm is moved into the extended state thereby to move the cassette received therein into the docking station.

9. A media carousel changer according to claim 8 wherein each of said cassette holders includes a ramp structure, said roller assembly attacking said ramp structure when said plunger arm moves toward the first advanced position, contact of said roller assembly with said ramp structure operative to positively urge said registered one of said cassette holders into the extended position whereby the cassette received therein is positively urged into the docked state in said recorder/reader.

10. A media carousel changer adapted to receive a plurality of cassettes containing a recording medium and operative to mount said cassettes into a docking station on a recorder/reader and to demount the cassettes therefrom, comprising:
  (a) a support frame;
  (b) a turntable disposed on said support frame and journaled for rotation about a turntable axis;
  (c) a plurality of cassette holders disposed about a periphery of said turntable, each said cassette holder for receiving a respective one of the plurality of cassettes containing the recording medium and being pivotally mounted to said turntable such that each said cassette holder is selectively pivotable between an extended position and a retracted position, each of said cassette holders includes a resilient latch member positioned to retain a respective cassette received therein;
  (d) a rotary drive operative to rotate said turntable thereby to consecutively move each of said cassette holders into registration with said docking station; and
  (e) a plunger arm linearly movable between a first advanced position and a withdrawn position, said plunger arm operative when advanced to pivot a registered one of said cassette holders into the extended position thereby to move the cassette received therein into the docking station and into a docked state with respect to said recorder/reader and operative when withdrawn to permit said registered one of said cassette holders to pivot into a retracted position thereby to demount the cassette received therein from the recorder/reader so that said cassette moves to a stored state.

11. A media carousel changer according to claim 10 wherein said cassettes each have a leader block secured to the recording medium thereof and a detent structure which releasably holds said leader block in a fastened state with respect to said cassette, said latch member sized and positioned to positively urge said leader block into the fastened state.

12. A media carousel changer adapted to receive a plurality of cassettes containing a recording medium and operative to mount said cassettes into a docking station on a recorder/reader and to demount the cassettes therefrom, comprising:
(a) a support frame;
(b) a turntable disposed on said support frame and journaled for rotation about a turntable axis;
(c) a plurality of cassette holders disposed about a periphery of said turntable, each said cassette holder for receiving a respective one of the plurality of cassettes containing the recording medium and being pivotally mounted to said turntable such that each said cassette holder is selectively pivotable between an extended position and a retracted position;
(d) a rotary drive operative to rotate said turntable thereby to consecutively move each of said cassette holders into registration with said docking station;
(e) a plunger arm linearly movable between a first advanced position and a withdrawn position, said plunger arm operative when advanced to pivot a registered one of said cassette holders into the extended position thereby to move the cassette received therein into the docking station and into a docked state with respect to said recorder/reader and operative when withdrawn to permit said registered one of said cassette holders to pivot into a retracted position thereby to demount the cassette received therein from the recorder/reader so that said cassette moves to a stored state; and
(f) a reversible actuator motor having a gear drive that mechanically advances and withdraws said plunger arm.

13. A media carousel changer adapted to receive a plurality of cassettes containing a recording medium and operative to mount said cassettes into a dock ing station on a recorder/reader and to demount the cassettes therefrom, comprising:
(a) a support frame;
(b) a turntable disposed on said support frame and journaled for rotation about a turntable axis;
(c) a plurality of cassette holders disposed about a periphery of said turntable, each said cassette holder for receiving a respective one of the plurality of turntable such that each said cassette holder is selectively pivotable between an extended position and a retracted position;
(d) a rotary drive operative to rotate said turntable thereby to consecutively move each of said cassette holders into registration with said docking station; and
(e) a plunger arm is linearly movable between a first advanced position and a withdrawn position, said plunger arm operative when advanced to pivot a registered one of said cassette holders into the extended position thereby to move the cassette received therein into the docking station and into a docked state with respect to said recorder/reader and operative when withdrawn to permit said registered one of said cassette holders to pivot into a retracted position thereby to demount the cassette received therein from the recorder/reader so that said cassette moves to a stored state, and wherein said plunger arm is reciprocal between the first advanced position and a second advanced position, said plunger arm when in the second advanced position operative to move another one of said cassette holders and its respective cassette into an intermediate position between the extended an d retracted positions.

14. A media carousel changer adapted to receive a plurality of cassettes containing a recording medium and operative to mount said cassettes into a docking station on a recorder/reader and to demount the cassettes therefrom, comprising:
(a) a support frame;
(b) a turntable disposed on said support frame and journaled for rotation about a turntable axis;
(c) a plurality of cassette holders disposed about a periphery of said turntable, each said cassette holder for receiving a respective one of the plurality of cassettes containing the recording medium and being pivotally mounted to said turntable such that each said cassette holder is selectively pivotable between an extended position and a retracted position;
(d) a rotary drive operative to rotate said turntable thereby to consecutively move each of said cassette holders into registration with said docking station;
(e) a plunger arm linearly movable between a first advanced position and a withdrawn position, said plunger arm operative when advanced to pivot a registered one of said cassette holders into the extended position thereby to move the cassette received therein into the docking station and into a docked state with respect to said recorder/reader and operative when withdrawn to permit said registered one of said cassette holders to pivot into a retracted position thereby to demount the cassette received therein from the recorder/reader so that said cassette moves to a stored state; and
(f) a second plunger arm acting oppositely to said first plunger arm, said first plunger arm operative to reciprocate between the first advanced position and the withdrawn position and said second plunger arm operative to reciprocate between a second advanced position and a second withdrawn position, said first and second plunger arms linked such that, when said first plunger arm moves into the first advanced position, said second plunger arm moves to the second advanced position to move another one of said cassette holders into an intermediate position between the extended and retracted position, and a driver operative to selectively reciprocate said first and second plunger arms.

15. A media carousel changer adapted to receive a plurality of cassettes containing a recording medium and operative to mount said cassettes into a docking station on a recorder/reader and to demount the cassettes therefrom, comprising:
(a) a support frame;
(b) a turntable disposed on said support frame and journaled for rotation about a turntable axis;
(c) a plurality of cassette holders disposed about a periphery of said turntable, each said cassette holder for receiving a respective one of the plurality of cassettes containing the recording medium and being pivotally mounted to said turntable such that each said cassette holder is selectively pivotable between an extended position and a retracted position;
(d) a rotary drive operative to rotate said turntable thereby to consecutively move each of said cassette holders into registration with said docking station; and
(e) a plunger arm linearly movable between a first advanced position and a withdrawn position, said plunger arm operative when advanced to pivot a registered one of said cassette holders into the extended position thereby to move the cassette received therein into the docking station and into a docked state with respect to said recorder/reader and operative when withdrawn to permit said registered one of said cassette holders to pivot into a retracted position thereby to demount the cassette received therein from the recorder/reader so that said cassette moves to a stored state, and wherein the respective cassette in said registered one of said cassette holders is in a first plane when in the docked state, said turntable being in a turntable plane that is substantially parallel to said first plane.

16. A media carousel changer according to claim 15 wherein each of said cassette holders is oriented in an upright relation to said turntable when in the stored position.

17. A media carousel changer adapted to receive a plurality of cassettes containing a recording medium and operative to mount said cassettes into a docking station on a recorder/reader and to demount the cassettes therefrom, comprising:

(a) a support frame;

(b) a turntable disposed on said support frame and journaled for rotation about a turntable axis;

(c) a plurality of cassette holders disposed about a periphery of said turntable, each said cassette holder for receiving a respective one of the plurality of cassettes containing the recording medium and being pivotally mounted to said turntable such that each said cassette holder is selectively pivotable between an extended position and a retracted position;

(d) a rotary drive operative to rotate said turntable thereby to consecutively move each of said cassette holders into registration with said docking station; and (e) a plunger arm linearly movable between a first advanced position and a withdrawn position, said plunger arm operative when advanced to pivot a registered one of said cassette holders into the extended position thereby to move the cassette received therein into the docking station and into a docked state with respect to said recorder/reader and operative when withdrawn to permit said registered one of said cassette holders to pivot into a retracted position thereby to demount the cassette received therein from the recorder/reader so that said cassette moves to a stored state, and wherein the respective cassette in said registered one of said cassette holders is in a first plane when in the docked relation, said turntable being in a turntable plane that is substantially perpendicular to said first plane.

18. A media carousel changer according to claim 17 wherein each of said cassette holders is oriented in the turntable plane when in the stored position.

19. A media carousel changer adapted to receive a plurality of cassettes containing a recording medium and operative to mount said cassettes into a docking station on a recorder/reader and to demount the cassettes therefrom, comprising:

(a) a support frame;

(b) a turntable disposed on said support frame and journaled for rotation about a turntable axis;

(c) a plurality of cassette holders disposed about a periphery of said turntable, each said cassette holder for receiving a respective one of the plurality of cassettes containing the recording medium and being pivotally mounted to said turntable such that each said cassette holder is selectively pivotable between an extended position and a retracted position;

(d) a rotary drive operative to rotate said turntable thereby to consecutively move each of said cassette holders into registration with said docking station;

(e) a plunger arm linearly movable between a first advanced position and a withdrawn position, said plunger arm operative when advanced to pivot a registered one of said cassette holders into the extended position thereby to move the cassette received therein into the docking station and into a docked state with respect to said recorder/reader and operative when withdrawn to permit said registered one of said cassette holders to pivot into a retracted position thereby to demount the cassette received therein from the recorder/reader so that said cassette moves to a stored state; and (f) a rotary position sensor operative to detect rotational positioning of said turntable.

20. A media carousel changer according to claim 19 wherein said rotary drive includes a plurality of guide wheels operative to support said turntable, a drive belt extending around an outer peripheral edge of said turntable and a motor operative to drive said drive belt.

21. A media carousel changer according to claim 20 wherein said drive belt is a toothed belt, said peripheral edge of said turntable provided with teeth operative to engage said drive belt.

22. A media carousel changer according to claim 20 wherein at least one of said guide wheels is adjustable in location.

23. A media carousel changer according to claim 19 wherein said rotary drive includes a rotatable shaft to which said turntable is fixed, said rotary position sensor including a shaft encoder for monitoring rotational positioning of said shaft.

24. A media carousel changer adapted to receive a plurality of cassettes containing a recording medium and operative to mount said cassettes into a docking station on a recorder/reader and to demount the cassettes therefrom, comprising:

(a) a support frame;

(b) a turntable disposed on said support frame and journaled for rotation about a turntable axis;

(c) a plurality of cassette holders disposed about a periphery of said turntable, each said cassette holder for receiving a respective one of the plurality of cassettes containing the recording medium and being pivotally mounted to said turntable such that each said cassette holder is selectively pivotable between an extended position and a retracted position;

(d) a rotary drive operative to rotate said turntable thereby to consecutively move each of said cassette holders into registration with said docking station; and (e) a plunger arm linearly movable between a first advanced position and a withdrawn position, said plunger arm operative when advanced to pivot a registered one of said cassette holders into the extended position thereby to move the cassette received therein into the docking station and into a docked state with respect to said recorder/reader and operative when withdrawn to permit said registered one of said cassette holders to pivot into a retracted position thereby to demount the cassette received therein from the recorder/reader so that said cassette moves to a stored state; and (f) an actuator position sensor operative to detect at least one of the advanced and retracted positions of said plunger arm.

25. A media carousel changer adapted to receive a plurality of cassettes containing a recording medium and operative to mount said cassettes into a docking station on a recorder/reader and to demount the cassettes therefrom, comprising:

(a) a support frame;

(b) a turntable disposed on said support frame and journaled for rotation about a turntable axis;

(c) a plurality of cassette holders disposed about a periphery of said turntable, each said cassette holder for receiving a respective one of the plurality of cassettes containing the recording medium and being pivotally mounted to said turntable such that each said cassette holder is selectively pivotable between an extended position and a retracted position;

(d) a rotary drive operative to rotate said turntable thereby to consecutively move each of said cassette holders into registration with said docking station; and (e) a plunger arm linearly movable between a first advanced position and a withdrawn position, said plunger arm operative when advanced to pivot a registered one of said cassette holders into the extended position thereby to move the cassette received therein into the docking station and into a docked state with respect to said recorder/reader and operative when withdrawn to permit said registered one of said cassette holders to pivot into a retracted position thereby to demount the cassette received therein from the recorder/reader so that said cassette moves to a stored state, and wherein said plunger arm is resiliently biased to apply a resilient force acting to bias the registered one of said cassette holders orthogonally into the docking station.

26. A media carousel changer according to claim 25 wherein said plunger arm is pivotally mounted with respect to said support frame and including a biasing spring disposed to pivot said plunger arm.

27. A media carousel changer adapted to receive a plurality of cassettes containing a recording medium and operative to mount said cassettes into a docking station on a recorder/reader and to demount the cassettes therefrom, comprising:

(a) a support frame;

(b) a turntable disposed on said support frame and journaled for rotation about a turntable axis;

(c) a plurality of cassette holders each including a catch and disposed about a periphery of said turntable, each said cassette holder for receiving a respective one of the plurality of cassettes containing the recording medium and being pivotally mounted to said turntable such that each said cassette holder is selectively pivotable between an extended position and a retracted position;

(d) a rotary drive operative to rotate said turntable thereby to consecutively move each of said cassette holders into registration with said docking station; and (e) a plunger arm linearly movable between a first advanced position and a withdrawn position, said plunger arm operative when advanced to pivot a registered one of said cassette holders into the extended position thereby to move the cassette received therein into the docking station and into a docked state with respect to said recorder/reader and operative when withdrawn to permit said registered one of said cassette holders to pivot into a retracted position thereby to demount the cassette received therein from the recorder/reader so that said cassette moves to a stored state, said plunger arm adapted to engage the catch associated with the registered one of said cassette holders as said plunger arm moves from the first advanced position to the withdrawn position so that the plunger arm physically moves the registered one of said cassette holders from the extended position and its respective cassette out of the docked state.

\* \* \* \* \*

UNITED STATES PATENT AND TRADEMARK OFFICE
CERTIFICATE OF CORRECTION

PATENT NO. : 6,804,080 B1
DATED : October 12, 2004
INVENTOR(S) : Stephan E. Gavit, Scott A. Dye and Robert E. Leonard It is certified that error appears in the above-identified patent and that said Letters Patent is hereby corrected as shown below:

Column 7,
Line 26, "FIGS. 5 and 5", should read -- FIGS. 5 and 6 --;

Column 12,
Line 38, "FIGS. 118" should read -- FIGS. 1-18 --.

Signed and Sealed this

Fifth Day of April, 2005

JON W. DUDAS
*Director of the United States Patent and Trademark Office*